(12) United States Patent
Salmela et al.

(10) Patent No.: US 10,749,731 B2
(45) Date of Patent: Aug. 18, 2020

(54) FACILITATING SECURE COMMUNICATION BETWEEN A CLIENT DEVICE AND AN APPLICATION SERVER

(71) Applicant: Telefonaktiebolaget LM Ericsson (publ), Stockholm (SE)

(72) Inventors: Patrik Salmela, Espoo (FI); Gustavo Tanoni, St-Lambert (CA)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 141 days.

(21) Appl. No.: 15/742,281

(22) PCT Filed: Jul. 6, 2015

(86) PCT No.: PCT/SE2015/050800
§ 371 (c)(1),
(2) Date: Jan. 5, 2018

(87) PCT Pub. No.: WO2017/007385
PCT Pub. Date: Jan. 12, 2017

(65) Prior Publication Data
US 2018/0198670 A1    Jul. 12, 2018

(51) Int. Cl.
*H04L 29/06* (2006.01)
*H04L 9/32* (2006.01)
(Continued)

(52) U.S. Cl.
CPC ........ *H04L 29/06714* (2013.01); *H04L 9/321* (2013.01); *H04L 61/305* (2013.01);
(Continued)

(58) Field of Classification Search
CPC ... H04L 29/06; H04L 29/06714; H04L 63/08; H04L 63/0876; H04L 63/061; H04L 9/32;
(Continued)

(56) References Cited

U.S. PATENT DOCUMENTS

| 7,512,408 | B2 * | 3/2009 | Marais | H04L 67/14 455/466 |
| 7,870,389 | B1 * | 1/2011 | Leung | H04L 9/083 380/255 |

(Continued)

FOREIGN PATENT DOCUMENTS

| CN | 102379114 A | * | 3/2012 | ............. H04L 29/06 |
| KR | 20070103780 A | * | 10/2007 | ............ H04W 12/06 |

(Continued)

OTHER PUBLICATIONS

Access to network application functions using HTTP over TLS by (ETSI) (3GPP TS 33.222 version 6.2.0 Release 6) Dec. 2004 No. of pp. 20 (Year: 2004).*

(Continued)

*Primary Examiner* — Jeffrey C Pwu
*Assistant Examiner* — Ali H. Cheema
(74) *Attorney, Agent, or Firm* — Rothwell, Figg, Ernst & Manbeck, P.C.

(57) ABSTRACT

It is presented a method for facilitating secure communication between a client device and an application server. The method comprises the steps of: receiving a client request from the client device, the client request comprising a first fully qualified domain name, FQDN, for the application server, and at least a portion being bound for the application server; forwarding the client request to the application server; receiving an application server response from the application server, the application server response indicating a need to provide authentication; obtaining an original context identifier from an authentication server; generating a modified context identifier based on the original context identifier and a client identifier, being an identifier of the client device; generating a client specific shared key based on the first FQDN, the client identifier and a shared key which is not specific to the client device; and providing the (Continued)

modified context identifier, the client specific shared key to the client device to use for authentication with the application server.

22 Claims, 5 Drawing Sheets

(51) Int. Cl.
  *H04W 12/04* (2009.01)
  *H04L 29/12* (2006.01)
(52) U.S. Cl.
  CPC ........ *H04L 63/061* (2013.01); *H04L 63/0876* (2013.01); *H04W 12/04031* (2019.01); *H04L 9/32* (2013.01); *H04L 29/06* (2013.01); *H04L 61/30* (2013.01); *H04L 63/06* (2013.01); *H04L 63/08* (2013.01); *H04L 63/164* (2013.01); *H04L 63/168* (2013.01); *H04W 12/04* (2013.01)
(58) Field of Classification Search
  CPC ......... H04L 67/14; H04L 9/321; H04L 61/30; H04L 61/305; H04L 63/16; H04L 63/0492; H04L 63/168; H04L 63/164; H04L 63/029; H04L 63/0815; H04L 29/12066; H04L 63/101; H04L 9/083; H04L 12/189; H04L 67/04; H04L 67/1097; H04L 63/062; H04L 63/0281; H04W 12/04; H04W 12/04031; H04W 12/06; H04W 12/0609; H04W 12/08; H04W 28/08; H04W 76/10; G06F 15/16
  USPC ........ 713/171, 175, 181, 182, 168; 726/1, 2, 726/6, 3, 4; 380/255; 709/203, 224
  See application file for complete search history.

(56) References Cited

U.S. PATENT DOCUMENTS

| | | | | |
|---|---|---|---|---|
| 8,856,323 | B2* | 10/2014 | Enns | H04W 76/10 709/224 |
| 9,148,408 | B1* | 9/2015 | Glazemakers | H04L 63/101 |
| 2005/0246548 | A1* | 11/2005 | Laitinen | H04L 63/08 713/182 |
| 2007/0288754 | A1* | 12/2007 | Kaji | H04L 67/14 713/175 |
| 2009/0094684 | A1* | 4/2009 | Chinnusamy | H04L 63/0281 726/4 |
| 2010/0223468 | A1* | 9/2010 | Sun | H04L 63/062 713/168 |
| 2011/0271117 | A1* | 11/2011 | Qiang | H04L 63/164 713/181 |
| 2011/0302627 | A1* | 12/2011 | Blom | H04L 67/04 726/2 |
| 2012/0027211 | A1* | 2/2012 | Lehtovirta | H04L 12/189 380/255 |
| 2012/0185924 | A1* | 7/2012 | Tsirtsis | H04L 29/12066 726/6 |
| 2012/0254959 | A1* | 10/2012 | Schmidt | H04L 63/0815 726/6 |
| 2013/0007858 | A1* | 1/2013 | Shah | H04L 63/0815 726/6 |
| 2013/0283345 | A1* | 10/2013 | Kahana | G06F 15/16 726/1 |
| 2014/0282865 | A1* | 9/2014 | Wachter | H04W 12/08 726/3 |
| 2015/0019620 | A1* | 1/2015 | Gidron | H04L 67/1097 709/203 |
| 2015/0058913 | A1* | 2/2015 | Kandasamy | H04L 63/061 726/1 |
| 2016/0234182 | A1* | 8/2016 | Bone | H04W 28/08 |
| 2016/0277927 | A1* | 9/2016 | Lee | H04W 12/0609 |
| 2016/0286600 | A1* | 9/2016 | Faccin | H04L 63/0876 |

FOREIGN PATENT DOCUMENTS

| | | |
|---|---|---|
| WO | 2010095988 A1 | 8/2010 |
| WO | 2014193278 A1 | 12/2014 |

OTHER PUBLICATIONS

International Search Report and Written Opinion issued in International Application No. PCT/SE2015/050800, dated Mar. 18, 2016, 12 pages.
Francois Ennesser: "Consideration on M2M security interworking with M2M Areas Networks, for M2M Release 2", ETSI M2M#21 Meeting, Sophia Antipolis, Jul. 20, 2012, pp. 1-17.
3GPP TS 24.109 V12.3.0, 3rd Generation Partnership Project; Technical Specification Group Core Network and Terminals; Bootstrapping interface (Ub) and network application function interface (Ua); Protocol details (Release 12), Mar. 2014, 77 pages.
European Communication Pursuant to Article 94(3) EPC, issued in European Application No. 15 745 579.1-1218, dated Nov. 15, 2019 (5 pages).

* cited by examiner

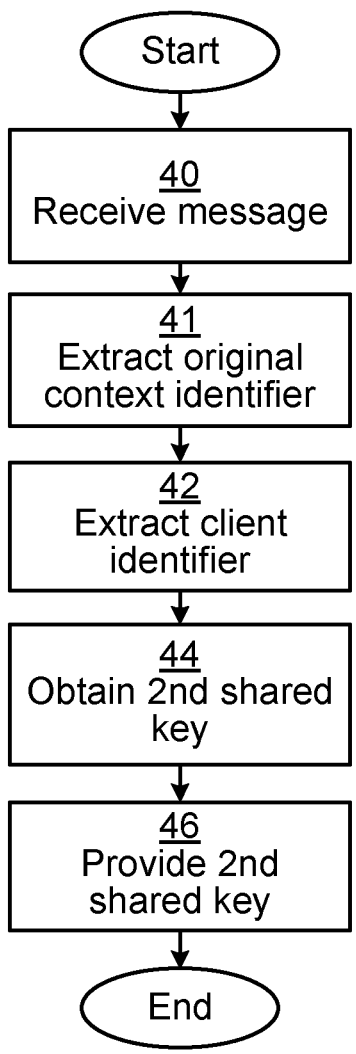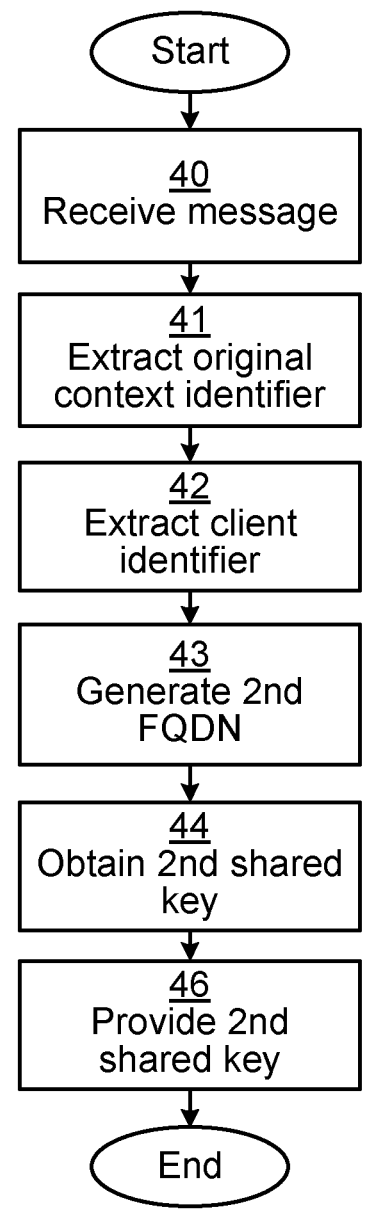
Fig. 6A
Fig. 6B

FACILITATING SECURE COMMUNICATION BETWEEN A CLIENT DEVICE AND AN APPLICATION SERVER

CROSS REFERENCE TO RELATED APPLICATION(S)

This application is a 35 U.S.C. § 371 National Stage of International Patent Application No. PCT/SE2015/050800, filed July 6, 2015, designating the United States, the disclosure of which is incorporated by reference.

TECHNICAL FIELD

The technology relates to facilitating secure communication between a client device and an application server.

BACKGROUND

Capillary networks allow resource constrained client devices to communicate with application servers, using an intermediate gateway, e.g. connected via a mobile communication network. However, the application server may dictate the use of authentication credentials to allow access.

Conventionally, when a client device connects to the application server via a mobile communication network, credentials related to the mobile communication network, such as $3^{rd}$ Generation Partnership Project (3GPP) credentials can be used for authentication with the help of an authentication server, which may e.g. implement a Bootstrapping Server Function (BSF) when Generic Bootstrapping Architecture (GBA) is used.

However, in capillary networks, the client devices are often resource constrained devices that may not be able to handle or even store 3GPP credentials securely.

SUMMARY

An object is to provide a way in which client devices of a capillary network can connect securely to application servers.

According to a first aspect, it is presented a method for facilitating secure communication between a client device and an application server. The method is performed in a gateway and comprises the steps of: receiving a client request from the client device, the client request comprising a first fully qualified domain name, FQDN, for the application server, and at least a portion being bound for the application server; forwarding the client request to the application server; receiving an application server response from the application server, the application server response indicating a need to provide authentication; obtaining an original context identifier from an authentication server; generating a modified context identifier based on the original context identifier and a client identifier, being an identifier of the client device; generating a client specific shared key based on the first FQDN, the client identifier and a shared key which is not specific to the client device; and providing the modified context identifier and the client specific shared key to the client device to use for authentication with the application server.

The step generating a client specific shared key may comprise generating a second FQDN based on the first FQDN and the client identifier and generating the client specific shared key based on the second FQDN.

The step of providing the modified context identifier and the client specific shared key may comprise sending a configuration message for configuring the credentials over a device management protocol, the configuration message comprising the modified context identifier and the client specific shared key, to the client device. The configuration message may also comprise a pointer (e.g. FQDN) to the application server for which the client specific shared key applies.

The step of providing the modified context identifier and the client specific shared key may comprise modifying a key exchange message from the application server to the client device by including the modified context identifier and the client specific shared key in the key exchange message prior to forwarding the key exchange message to the client device.

The step of obtaining the original context identifier may comprise the use of a generic bootstrapping architecture, GBA.

According to a second aspect, it is presented a gateway for facilitating secure communication between a client device and an application server. The gateway comprises: a processor; and a memory storing instructions that, when executed by the processor, cause the gateway to: receive a client request from the client device, the client request comprising a first fully qualified domain name, FQDN, for the application server, and at least a portion being bound for the application server; forward the client request to the application server; receive an application server response from the application server, the application server response indicating a need to provide authentication; obtain an original context identifier from an authentication server; generate a modified context identifier based on the original context identifier and a client identifier, being an identifier of the client device; generate a client specific shared key based on the first FQDN, the client identifier and a shared key which is not specific to the client device; and provide the modified context identifier and the client specific shared key to the client device to use for authentication with the application server.

The instructions to generate a client specific shared key may comprise instructions that, when executed by the processor, cause the gateway to generate a second FQDN based on the first FQDN and the client identifier and generating the client specific shared key based on the second FQDN.

The instructions to provide the modified context identifier and the client specific shared key may comprise instructions that, when executed by the processor, cause the gateway to send a configuration message for configuring the credentials over a device management protocol, the configuration message comprising the modified context identifier and the client specific shared key, to the client device.

The instructions to provide the modified context identifier and the client specific shared key may comprise instructions that, when executed by the processor, cause the gateway to modify a key exchange message from the application server to the client device by including the modified context identifier and the client specific shared key in the key exchange message prior to forwarding the key exchange message to the client device.

The instructions to obtain the original context identifier may comprise instructions that, when executed by the processor, cause the gateway to use a generic bootstrapping architecture, GBA.

According to a third aspect, it is presented a gateway comprising: means for receiving a client request from a client device, the client request comprising a first fully qualified domain name, FQDN, for an application server, and at least a portion being bound for the application server; means for forwarding the client request to the application server; means for receiving an application server response from the application server, the application server response indicating a need to provide authentication; means for obtaining an original context identifier from an authentication server; means for generating a modified context identifier based on the original context identifier and a client identifier, being an identifier of the client device; means for generating a client specific shared key based on the first FQDN, the client identifier and a shared key which is not specific to the client device; and means for providing the modified context identifier and the client specific shared key to the client device to use for authentication with the application server.

According to a fourth aspect, it is presented a computer program for facilitating secure communication between a client device and an application server, the computer program comprising computer program code which, when run on a gateway cause the gateway to: receive a client request from the client device, the client request comprising a first fully qualified domain name, FQDN, for the application server, and at least a portion being bound for the application server; forward the client request to the application server; receive an application server response from the application server, the application server response indicating a need to provide authentication; obtain an original context identifier from an authentication server; generate a modified context identifier based on the original context identifier and a client identifier, being an identifier of the client device; generate a client specific shared key based on the first FQDN, the client identifier and a shared key which is not specific to the client device; and provide the modified context identifier and the client specific shared key to the client device to use for authentication with the application server.

According to a fifth aspect, it is presented a computer program product comprising a computer program according to the fourth aspect and a computer readable means on which the computer program is stored.

According to a sixth aspect, it is presented a method for facilitating secure communication between a client device and an application server. The method is performed in a network node and comprises the steps of: receiving a message comprising a first fully qualified domain name, FQDN, for the application server and a modified context identifier; extracting an original context identifier from the modified context identifier; extracting a client identifier, being an identifier of the client device, from the modified context identifier; obtaining a second client specific shared key based on the first FQDN, the original context identifier and the client identifier; and providing the second client specific shared key for authentication of the client device.

The method may further comprise instructions that, when executed by the processor, cause the network node to: generate a second FQDN based on the first FQDN and the client identifier. In such a case, the step of obtaining the second client specific shared key comprises obtaining the second client specific shared key based on second FQDN and the original context identifier.

The network node may be an authentication server. In such a case, the step of obtaining the second client specific shared key comprises generating the second client specific shared key based on the first FQDN, the original context identifier, and the client identifier. The original context identifier is used to locate a shared key which is not specific to the client device.

The network node may be the application server. In such a case the step of obtaining the second client specific shared key comprises querying an authentication server for the second client specific shared key by providing the first FQDN, the original context identifier and the client identifier.

The step of obtaining the second client specific shared key may comprise sending the client identifier as a separate parameter.

According to a seventh aspect, it is presented a network node for facilitating secure communication between a client device and an application server. The network node comprises: a processor; and a memory storing instructions that, when executed by the processor, cause the network node to: receive a message comprising a first fully qualified domain name, FQDN, for the application server and a modified context identifier; extract an original context identifier from the modified context identifier; extract a client identifier, being an identifier of the client device, from the modified context identifier; obtain a second client specific shared key based on the first FQDN, the original context identifier and the client identifier; and provide the second client specific shared key for authentication of the client device.

The network node may further comprise instructions that, when executed by the processor, cause the network node to: generate a second FQDN based on the first FQDN and the client identifier. In such a case, the instructions to obtain the second client specific shared key comprise instructions that, when executed by the processor, cause the network node to obtain the second client specific shared key based on the second FQDN and the original context identifier.

The network node may be an authentication server. In such a case, the instructions to obtain the second client specific shared key comprise instructions that, when executed by the processor, cause the network node to generate the second client specific shared key based on the first FQDN, the original context identifier, and the client identifier.

The network node may be the application server. In such a case, the instructions to obtain the second client specific shared key comprise instructions that, when executed by the processor, cause the network node to query an authentication server for the second client specific shared key by providing the first FQDN, the original context identifier and the client identifier.

The instructions to obtain the second client specific shared key may comprise instructions that, when executed by the processor, cause the network node to send the client identifier as a separate parameter.

According to an eighth aspect, it is presented a network node comprising: means for receiving a message comprising a first fully qualified domain name, FQDN, for the application server and a modified context identifier; means for extracting an original context identifier from the modified context identifier; means for extracting a client identifier, being an identifier of the client device, from the modified context identifier; means for obtaining a second client specific shared key based on the first FQDN, the original context identifier and the client identifier; and means for providing the second client specific shared key for authentication of the client device.

According to a ninth aspect, it is presented a computer program for facilitating secure communication between a client device and an application server. The computer program comprises computer program code which, when run on a network node, cause the network node to: receive a message comprising a first fully qualified domain name, FQDN, for the application server and a modified context identifier; extract an original context identifier from the modified context identifier; extract a client identifier, being an identifier of the client device, from the modified context identifier; obtain a second client specific shared key based on the first FQDN, the original context identifier and the client identifier; and provide the second client specific shared key for authentication of the client device.

According to a tenth aspect, it is presented a computer program product comprising a computer program according to the ninth aspect and a computer readable means on which the computer program is stored.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which:

FIGS. 6A-B are flow charts illustrating methods facilitating secure communication between the client device and application server performed by a network node of FIGS. 1A-B;

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1A:
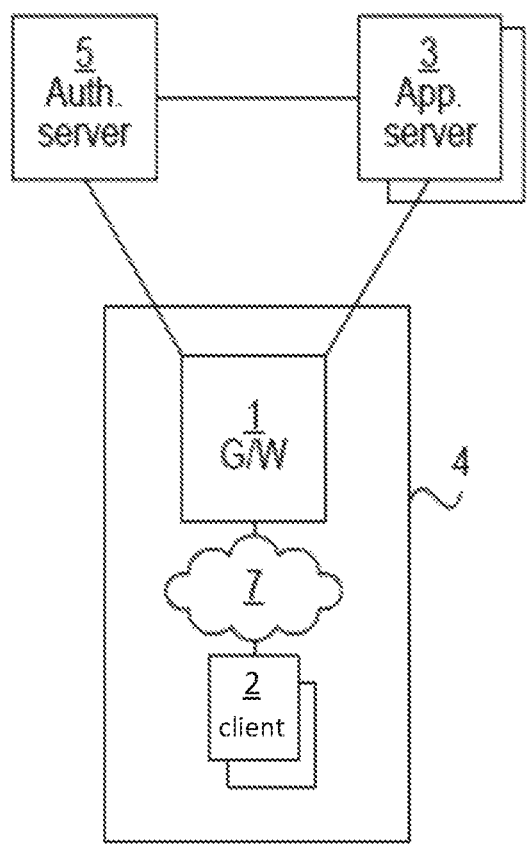
FIGS. 1A-B are schematic diagrams illustrating environments where embodiments presented herein can be applied.
Figure 1B:
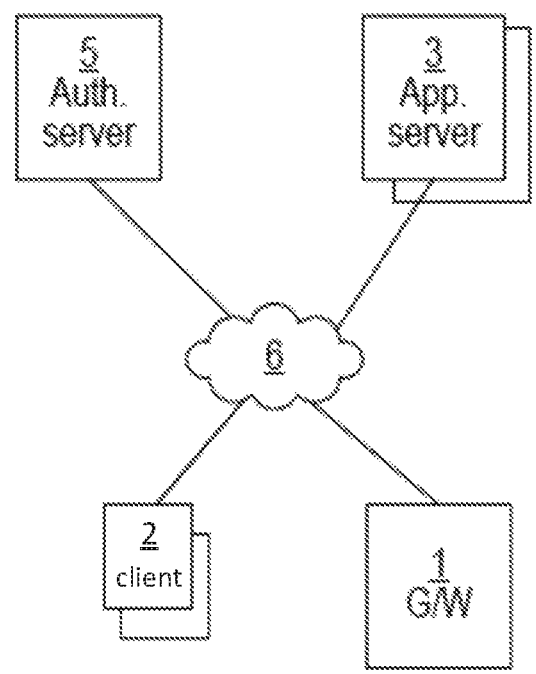

FIGS. 1A-B are a schematic diagram illustrating environments where embodiments presented herein can be applied.

Looking first to FIG. 1A, a number of client devices 2 are connected via a network 7 to a gateway 1. Each client device 2 communicates on occasion with one or more of a set of application servers 3. The connection between the client devices 2 and the gateway 1 can be wireless, e.g. using ZigBee, Wi-Fi (IEEE 802.11), Bluetooth, etc., or wired, e.g. using Ethernet, USB, a serial or parallel connection, etc. The client devices are optionally integrated in any suitable type of host device, e.g. devices making use of a sensor device, an actuator device, or a sensor and actuator device. For instance, the host device can be a home automation device, a vehicle or a home electronics device e.g. media player, camera, television, etc. It is to be noted that the client device can be a sensor and/or actuator in itself or the host device.

The gateway 1 is in turn connected to one or more of the applications servers 3 to allow communication between the client devices 2 and the application servers 3. The application servers are any suitable server and can e.g. implement a Network Application Function (NAF) as defined in 3GPP TS 33.220 V12.0.0.

The connection between the gateway 1 and the application server 3 and the authentication server 5 may occur over an IP based network being wired based, wireless and/or using a mobile communication network. The mobile communications network may e.g. comply with any one or a combination of 3GPP ($3^{rd}$ Generation Partnership Project) standards such as LTE (Long Term Evolution) or UMTS utilising W-CDMA (Wideband Code Division Multiplex), or other standards such as CDMA2000 (Code Division Multiple Access 2000). The gateway 1 along with the network 7 and the client devices 2 are collectively called a capillary network 4. The connection between the gateway 1 and the application servers 3 and the authentication server 5 may also include a connection through a wide area network such as the Internet, providing no real restrictions on geographic separation between the application servers 3, authentication server 5 and the gateway 1.

The application server 3 may in some situations require that a connection to a client device 2 is to be encrypted and the client device be authenticated. A situation with a client device 2 without a gateway will now be described first.

The client device 2 then needs to have access to 3GPP credentials (or equivalent), such as e.g. in a USIM (Universal Subscriber Identity Module). The USIM can be provided using a physical card (such as a UICC, Universal Integrated Circuit Card) or by an electronically transferable subscriber identity module such as e.g. an MCIM (Machine Communications Identity Module). The client device 2 can then use the 3GPP credentials (or equivalent credentials) to obtain credentials using the authentication server 5 for authenticating itself towards the application server 3. The client device 2 is then authenticated by the application server 3 using the authentication server 5 e.g. in accordance with the Generic Bootstrapping Architecture (see 3GPP TS 33.220 V12.0.0). The mutual authentication between the client device 2 and the application server 3 is based on the combination of the mutual authentication between the authentication server 5 and the device 2 as well as the trust relationship between the authentication server 5 and the application server 3. Hence, if the application server 3 does not have a direct or indirect (e.g. via an operator roaming agreement) trust relationship with the authentication server 5, it will not be able to communicate with the authentication server 5 to get the keys and thus cannot be authenticated by the client device 2.

The authentication server 5 can e.g. implement a Bootstrapping Server Function (BSF) where, using a mutual authentication between the client device and the BSF, a mutual authentication of the client device 2 and the application server 3 is also achieved. The client device can connect to the application server 3 and provide a context identifier such as e.g. a B-TID (Bootstrapping transaction identifier), which the application server 3 can use to query the authentication server 5 for the associated key. The result of this is that both the application server 3 and the client device 2 now share a secret key that can be used for security functions.

However, in many cases, the client devices 2 are constrained devices, such as sensor devices or actuator devices or a combination thereof, with low processing power, limited or no access to secure storage and minimal or no user interface. Alternatively, the client device is any device that does not have a SIM card or other 3GPP credentials, e.g. such as a laptop or desktop computer.

According to embodiments presented herein, when there is the need to utilize 3GPP based services from the constrained devices in the capillary network, e.g. through the Generic Bootstrapping Architecture (GBA), the client devices are assisted by the gateway 1. The gateway 1 can act as a proxy between the client devices 2 and the application servers 3, communicating with the authentication server 5, generating a client specific shared key for each client device when needed and providing the client specific shared key to the client device in question so that client device can authenticate itself in communication with the application server 3. As is explained in more detail below, this not only allows such a resource limited client device 2 to connect to an application server 3 using the 3GPP credentials of the gateway 1, but also allows such a connection to be secure in relation to other client devices connecting to the same application server 3 using the same gateway 1.

The gateway 1 can be an HTTP (HyperText Transfer Protocol) proxy or a COAP (Constrained Application Protocol) proxy. Here, the gateway 1 is an implicit proxy, whereby the client device 2 is unaware of the gateway (proxy) 1 when communicating with the application server 3.

Looking now to FIG. 1B, the gateway is an explicit proxy and can be placed anywhere with access to a second network 6 being a local area network (LAN), a wide area network (WAN) such as the Internet or a combination of both.

The gateway 1 can be an HTTP (HyperText Transfer Protocol) proxy or other network proxy. Here, the gateway 1 is an explicit proxy, whereby the client device 2 is aware of the gateway 1. When the gateway is an explicit proxy, it can be located anywhere where it can communicate with the client devices 2, the authentication server 5 and the application server 3, via the second network 6. Hence, the gateway does note need to be located on the communication path otherwise used between the client device and the application server.

Figure 2:
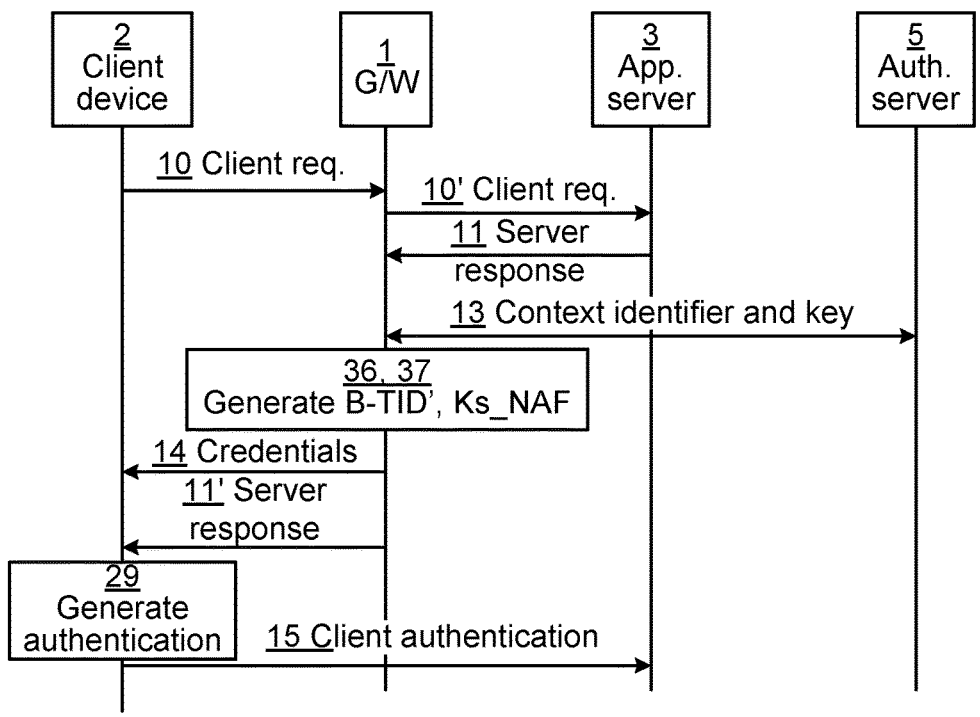
FIG. 2 is a sequence diagram illustrating an embodiment which can be applied in the environment shown in FIGS. 1A-B.

FIG. 2 is a sequence diagram illustrating an embodiment which can be applied in the environment shown in FIGS. 1A-B. This sequence diagram illustrates when connection establishment is started with a request and an "unauthorized" response.

The client device 2 sends a client request 10 to the gateway 1. The client request 10 can e.g. be an HTTP request or a COAP request. The client request 10 is a request bound for the application server 3. The client request comprises a first (unmodified) FQDN (Fully Qualified Domain Name) which is a pointer to the application server, e.g. naf.foo.com.

When the gateway 1 is an implicit proxy, the client request 10 is bound for the application server itself and the gateway only acts as a router of the client request. When the gateway 1 is an explicit proxy, the client request 10 comprises at least a portion which is bound for the application server, where the header of the client request can be modified to have the target address of the application server 3.

The gateway 1 then forwards the client request 10' to the application server 3. When the gateway 1 is an implicit proxy, the forwarded request 10' is identical to the original client request 10.

The application server 3 responds to the forwarded client request 10 with a server response 11 to the gateway 1. The server response 11 is of the same type as the client request 10', i.e. HTTP or COAP, respectively. Also, the server response 11 here indicates a need to provide authentication. For instance, in the case of HTTP, the server response can include an HTTP status code of 401 "unauthorized", indicating that authentication is needed.

The gateway 1 then obtains a context identifier 13 from the authentication server 5. Also, the gateway and the authentication server each generate a shared key Ks which is not specific to a client device. The context identifier and the key is to be used for setting up a secure connection between the client device 2 and the application server 3. In this embodiment, the context identifier is a B-TID parameter in accordance with GBA, but any suitable context identifier could be used. The gateway 1 then generates 36 a modified context identifier (denoted B-TID' here) based on the original context identifier from the authentication server 5 and a client identifier being an identifier of the client device. By using the client identifier in generating the modified context identifier, the application server 3 is able to separate secure sessions between different client devices 2 even though the 3GPP authentication end point may be the same gateway 1. For instance, a string for the client identifier could be added in a suitable position of the string for the context identifier, as explained in more detail below. This results in a modified context identifier.

The gateway 1 also generates 37 a client specific shared key (denoted Ks_NAF here) based on the shared key Ks which is not specific for the client device, the first (unmodified) FQDN of the application server 3, and the client identifier. This can be done using these three parameters explicitly or by combining the client identifier and the first FQDN to get a second (modified) FQDN. In this embodiment, the client specific shared key is a KS_NAF which is a shared key in GBA, but the client specific shared key could be in accordance with any suitable format. Since the client specific shared key KS_NAF is based on the client identifier and the key Ks which is not shared by the gateway 1, different client devices will have different secret session keys bound to their identities. This way, different client devices are prevented from gaining access to each other's secure sessions.

The generation 36 of the modified context identifier and the generation 37 of the client specific shared key are described in more detail below with reference to FIG. 5.

The modified context identifier and the client specific shared key are then provided as credentials 14 to the client device 2, e.g. using a device management protocol as explained in more detail below with reference to FIG. 5.

The gateway 1 also forwards the server response 11 to the client device 2. As explained above, the forwarded server response 11' also comprises an indication to provide authentication.

The client device 2 understands from the forwarded server response 11' that there is a need to provide authentication to connect to the application server 3 and generates 29 an authentication response, such as an HTTP digest response, based on the client specific shared key, e.g. using a hash function. There are other parameters that can be used as input for generating the authentication response, such as any one or more of the context identifier, application server specific parameters (e.g. realm, nonce, etc.), client specific parameters (e.g. client nonce, method URI, etc.). The client device then sends a new client request 15 to the gateway, bound for the application server 3. The new client request 15 comprises the credentials 14 (i.e. the modified context identifier and the authentication response).

The application server gets the authentication response in the a client authentication message 15 which can be a new request comprising the authentication response and is used to validate the client as explained in more detail with reference to FIG. 4 below.

Figure 3:
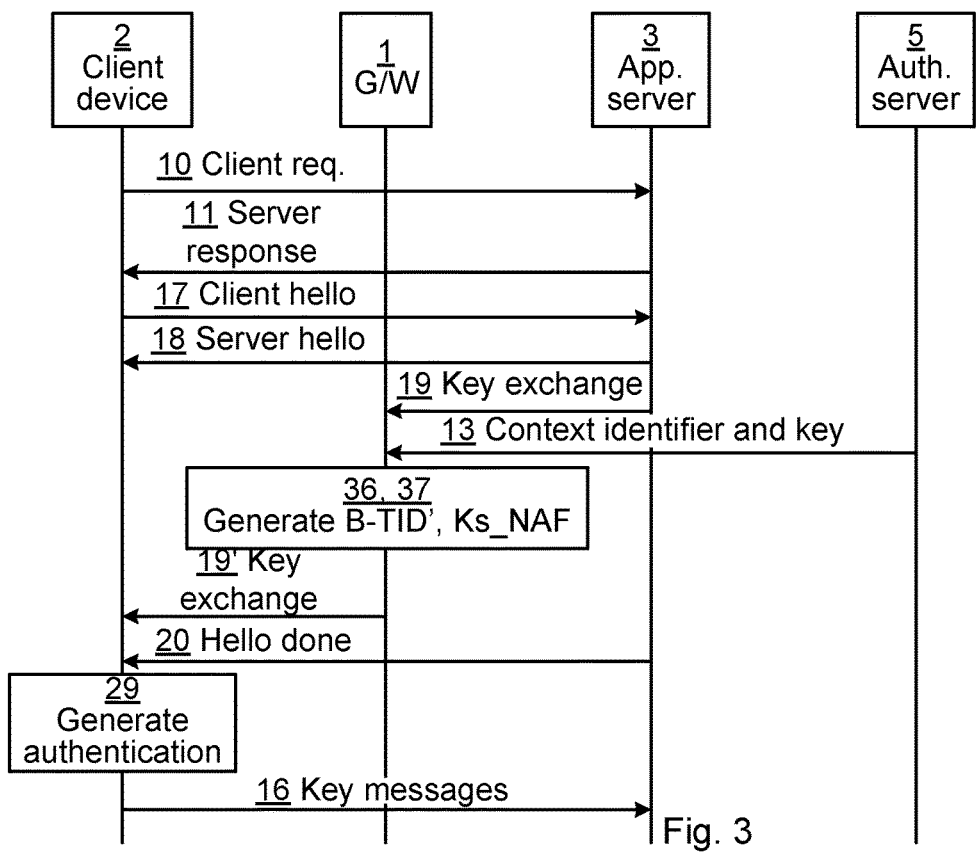
FIG. 3 is a sequence diagram illustrating an embodiment which can be applied in the environment shown in FIGS. 1A-B.

FIG. 3 is a sequence diagram illustrating an embodiment which can be applied in the environment shown in FIGS. 1A-B. There are many similarities to the embodiment illustrated in FIG. 2 and only differences to that embodiment will be described here. One difference is that FIG. 3 illustrates an embodiment where TLS (Transport Layer Security) is used for implicit authentication, which is not supported by the embodiment illustrated in FIG. 2. TLS can be a requirement dictated by the application server, as shown below. It is to be noted that the client device 2 and the application server 3 always communicate via the gateway 1; the gateway 1 forwards messages as required.

In this embodiment, the server response 11 from the application server 3 comprises a redirect to HTTPS message. This server response 11 indicates a redirection to HTTPS, e.g. using an HTTP 302 response message, or a move from COAP to COAPs which is basically COAP with DTLS (Datagram Transport Layer Security). Alternatively, the client device 2 can from the start assume that TLS/HTTPS is required and start the communication directly with a TLS ClientHello message, i.e. without messages 10 and 11.

The client device 2 then sends a client hello 17 to the application server 3. For instance, the client hello can be a TLS client hello message with at least one suggested PSK (Pre-Shared Key) TLS cipher suite.

The application server 3 responds with a server hello message 18, e.g. a TLS server hello message with a selected PSK TLS based cipher suite.

The application server 3 also sends a server key exchange message 19, e.g. indicating support for GBA based PSK TLS.

The gateway then proceeds as explained above with reference to FIG. 2, obtaining the context identifier and key, generating the modified context identifier and generating the client specific shared key. Here however, instead of providing the credentials (i.e. the modified context identifier and the client specific shared key) as a configuration message, the gateway can alternatively include the modified context identifier and the client specific shared key in the key exchange message, yielding a modified key exchange message 19', and forwards the modified key exchange message 19' to the client device.

The application server 3 then transmits a server hello done message 20 to the client device. Optionally, the modified context identifier and the client specific shared key could be included in the server hello done message 20 instead of the key exchange message.

The client can then reply with key message(s) 16, being e.g. a client key exchange message, a change cipher suite message and a finished message, to which the server replies (not shown) with a change cipher suite message and a finished message, in accordance with the method described below with reference to FIG. 4.

The client device 2 is now ready to communicate over a secure TLS connection with the application server 3.

Figure 4:
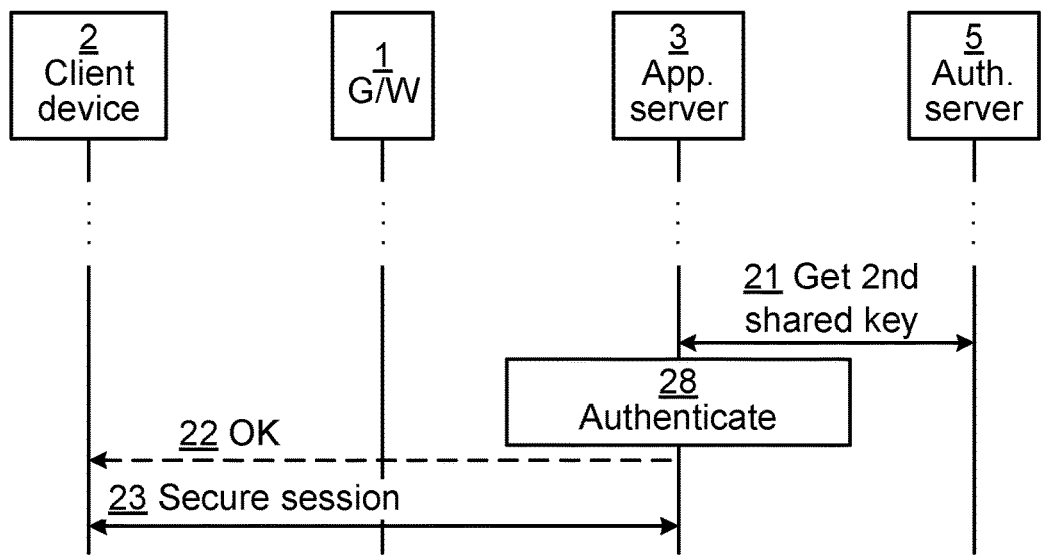
FIG. 4 is a sequence diagram illustrating an embodiment which can be applied in the environment shown in FIGS. 1A-B.

FIG. 4 is a sequence diagram illustrating an embodiment which can be applied in the environment shown in FIGS. 1A-B. This sequence occurs after either one of the sequences shown in FIG. 2 and FIG. 3, i.e. when the new client request 15 (FIG. 2) or the key message(s) 16 (FIG. 3) has/have reached the application server 3. In FIG. 2, the authentication message comprises the modified context identifier and the authentication response (e.g. digest response) based on the client specific shared key as explained above, hereinafter denoted the first client specific shared key. In FIG. 3, in the TLS case, the client key exchange message comprises the modified context identifier.

The application server now gets a second client specific shared key 21 from the authentication server 5. In the HTTP digest case (FIG. 2), the application server 3 queries the authentication server 5 for the key Ks_NAF when it gets the authentication message with the modified context identifier and the digest. In the TLS case (FIG. 3), the application server 3 queries the authentication server 5 for the key Ks_NAF when it receives the client key exchange message, which contains the modified context identifier as key identifier. The communication between the application server 3 and the authentication server 5 can be the same for both cases.

The application server 5 can obtain the second client specific shared key from the authentication server 5 in several ways. Here, two embodiments will be presented—a modified authentication server embodiment and a modified application server embodiment.

In the modified authentication server embodiment, the application server 3 does nothing with the modified context identifier and only includes the modified context identifier, and the FQDN in a request to the authentication server 5, to thereby obtain the second client specific shared key 21.

Hence, the application server 3 queries the authentication server 5, e.g. over the Zn interface, for the matching key Ks_NAF, just as according to the GBA standard, and receives from the authentication server 5 a response containing the second client specific shared key Ks_NAF (dependent on client identifier) and a USS (User Security Settings). The USS can in GBA contain the identifier of the client device that has been authenticated. This identifier can be the identifier of the client device 2 instead of the identifier of the gateway 1. Alternatively, both the identifier of the client device 2 and the identifier of the gateway 1 are present in the USS.

When the authentication server 5 gets the request for the key Ks_NAF from the application server 3, the request contains the FQDN of the application server 3 (unmodified) and the modified context identifier from the authentication response or client key exchange message. This modified context identifier is based on the original context identifier and the client identifier, as explained above. The authentication server 5 can determine when the context identifier is longer than expected, and thus determines that it is a modified context identifier also containing the client identifier. The authentication server 5 can now extract the client identifier from the modified context identifier, use the original context identifier for looking up the bootstrapping context (i.e. locating the shared key which is not specific to the client device), create the modified FQDN for the application server 3 by adding the client identifier as a prefix to the original FQDN of the application server 3 and calculate the client specific key Ks_NAF.

It is to be noted that the way of generating client specific keys could be different, e.g. the client identifier could be added to the key Ks before adding it to the key derivation function for deriving Ks_NAF or the function for deriving the keys could be modified to have the client identifier as a separate input parameter. In such a case, the modified FQDN does not need to be generated. Of course, the authentication server 5 and the gateway 1 need to generate the client specific shared keys in the same manner to allow authentication to occur.

When the authentication server 5 responds to the application server 3, it gives the second client specific shared key and the USS for this specific application server 3. The authentication server 5 can modify the USS and replace the gateway identifier found in the USS with the client identifier parsed from the received modified context identifier. Alternatively, the authentication server 5 can add a second identity field to the USS indicating the client identifier. For instance, the USS could contain information like: {ID=gateway ID, ID of delegate=client ID} OR {ID=client ID, delegator ID=CGW ID}. Which one to use depends on how the application server 3 should identify the connection peer in case it does not understand to parse both identifiers and does not understand their meaning.

Replacing the gateway ID with the client ID makes sense if the delegation of GBA from the client device to the gateway should be totally invisible to the application server. In this case, the application server will receive a USS with an identifier of the entity which has just authenticated itself, i.e. the client device. However, if the application server is developed to make use of more parameters, it might make sense to include also information about the gateway.

The application server 3 now has the second client specific shared key and can authenticate 28 the client device e.g. in the HTTP digest case by performing an analogous computation itself using the second client specific shared key and comparing with the authentication response from the client device, or implicitly in the TLS case using the TLS session for communication by generating a premaster secret from the second client specific shared key. The TLS session can then be set up and be used for secure communication, thereby acting as an implicit authentication. In the HTTP digest case, when, and only when, the computation response matches, the application server 3 transmits an OK message 22 as a response to the digest response, e.g. an HTTP 200 message and the client has been authenticated and a secure session can be established. HTTP digest can also be used as such for integrity protection. In this case, the client device calculates a new digest for each request it sends to the application server and the application server verifies the digest before replying to the request. The alternative is that the client specific shared key is used e.g. for securing HTTP using TLS, i.e. to establish an HTTPS session. In this embodiment, the application server does not need to be modified and can act according to standard specifications.

Turning now instead to the modified application server embodiment after receiving the second client request, the application server 3 parses the modified context identifier to thereby extract the original context identifier and the client identifier. The application server 3 also generates the modified FQDN, containing the client identifier. The application server 3 is then ready to obtain the second client specific shared key 21 from the authentication server 5 by sending a request with the modified FQDN and the original context identifier.

In this way, the authentication server 5 functionality does not need to be modified and it can generate the second client specific shared key based on the parameters given and send the second client specific shared key to the application server 3. Once the application server 3 has the second client specific shared key, it can authenticate the client device as explained above in the modified authentication server embodiment.

One issue with this approach is that the authentication server does not know whether the received FQDN has the client identifier in it or not. This is a problem when the authentication server needs to verify if the received application server FQDN is an application server that the authentication server is authorised to serve. As an example, the application server FQDN could be naf.com, naf.foo.com, naf.pub.foo.com or xyz.naf.com. This means that the authentication server can not directly from the FQDN deduce if the prefix is a client identifier or part of the original FQDN. When the client identifier is part of the context identifier which has a well defined format and prefix length, it is easy to see if the client identifier is embedded or not. For the application server FQDN, it is not as simple since the FQDN can be of variable length, which means that the authentication server would have to do a more complex comparison against the list of accepted application server FQDNs by also checking only parts of the received FQDN to the listed FQDNs.

In order to solve this issue, instead of providing the modified FQDN, the application server 3 can optionally provide the original FQDN and instead communicate the client identifier as an extension parameter. The authentication server 5 would then need to be modified to be able to receive the client identifier and use it to generate the second client specific shared key, but is also able to use the original FQDN to check if the FQDN is authorised.

After the connection is established between the client device 2 and the application server 3, application layer security can be used for further communication between the client device 2 and the application server 3.

Figure 5:
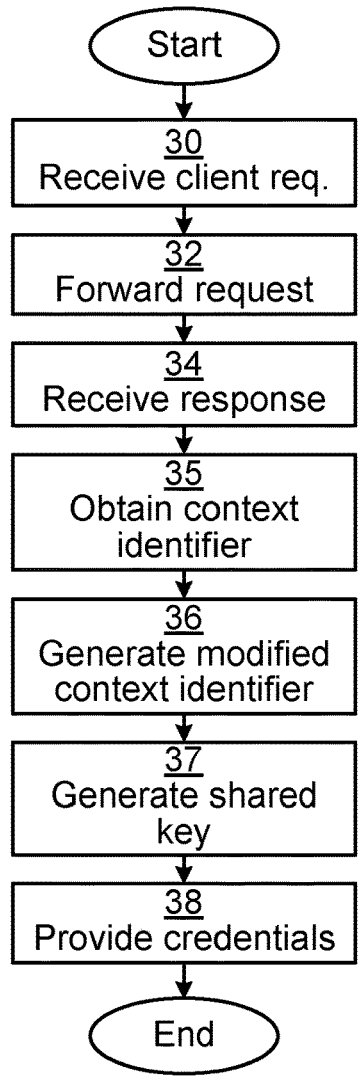
FIG. 5 is a flow chart illustrating methods for facilitating secure communication between the client device and application server of FIGS. 1A-B, performed by the gateway of FIGS. 1A-B.

FIG. 5 is a flow chart illustrating methods for facilitating secure communication between the client device 2 and application server 3 of FIGS. 1A-B, performed by the gateway 1 of FIGS. 1A-B. The method corresponds to the actions of the gateway 1 in FIGS. 2 and 3.

In a receive client request step 30, a client request 10 is received from the client device. The client request comprises a first FQDN for the application server and at least a portion being bound for the application server.

In a forward request step 32, the client request 10' is forwarded to the application server. The application server is pointed to by the FQDN.

In a receive response step 34, an application server response 11 is received from the application server. The application server response indicates a need to provide authentication. In the embodiment shown in FIG. 2, the application server response can be an HTTP 401 message while in the embodiment shown in FIG. 3, the application server response can be an HTTP 30x message, redirecting to HTTPS. HTTP 30x can e.g. be HTTP 302, HTTP 307, etc. which have different syntaxes.

In an obtain context identifier step 35, an original context identifier is obtained from an authentication server. This can comprise the use of GBA as exemplified above. Also at this stage, the gateway generates a shared key Ks as part of an Authentication and Key Agreement (AKA) protocol run between the gateway and the authentication server.

In a generate modified context identifier step 36, a modified context identifier is generated based on the original context identifier and the client identifier. By generating the modified context identifier based on the client identifier, it differs between different client devices connected to the same gateway and same application server. This allows secure flows for different client devices to be identified and separate.

One way to generate the modified context identifier is to insert the client identifier somewhere in the context identifier, i.e. the B-TID when GBA is used. A B-TID in GBA has the format base64encoded(RAND)@BSF_server_domain_name. RAND is a random (or pseudo-random) string of a fixed length, implying that the base64 encoded RAND will be of fixed length. When adding the client identifier to the B-TID this can be done either to the left or right of the '@' character.

The right side specifies the BSF (i.e. the authentication server, implementing BSF), and thus an operator that has generated this B-TID and is used by the application server for identifying the BSF it should contact for requesting the corresponding shared key Ks_NAF. Thus, by not modifying the right hand side of the '@' there are less requirements on modifications for the application server.

The left-hand side, i.e. the base64 encoded RAND, is to the application server just a string so adding extra information there does not affect the application server. The client identifier can be of various lengths, so one option is to add the client identifier after the base64 encoded RAND and just before the '@'. In this way, it is easy for the BSF to parse the two pieces of information from the B-TID' since it knows that the B-TID' begins with the fixed length base64 encoded RAND after which the client identifier follows. This is then followed by the BSF specific '@BSF_server_domain_name'. Thus, the modified B-TID' would look like: <base64 (RAND)><client ID>@BSF_server_domain_name. An alternative is to have the client identifier as a prefix to the B-TID', which would make parsing out the original B-TID easier. In this case the modified B-TID' would look like: <client ID><base64(RAND)>@BSF_server_domain_name. Other variations are also possible. A separation character between the <client ID> and <base64(RAND)>, such as '.' or '@', can be used to simplify parsing.

In a generate shared key step 37, a client specific shared key is generated based on the first FQDN, the client identifier and the shred key Ks which is not specific to the client device. This can comprise generating a second FQDN based on the first FQDN and the client identifier and generating the client specific shared key based on the second FQDN and the key Ks. The second FQDN can be a string concatenation of the original FQDN, the client identifier, and optionally one or more separation characters. As explained above, the way of generating client specific keys could be slightly different, e.g. the client identifier could be added to the key Ks before adding it to the key derivation function for deriving Ks_NAF or the function for deriving the keys could be modified to have the client identifier as a separate input parameter. In such a case, the modified FQDN does not need to be generated. Of course, the authentication server 5 and the gateway 1 need to generate the client specific shared keys in the same manner to allow authentication to occur.

In a provide credentials step 38, the modified context identifier and the client specific shared key are provided to the client device to use for authentication with the application server. This can comprise sending a configuration message for configuring the credentials over a device management protocol. The configuration message comprises the modified context identifier and the client specific shared key, to the client device, as described with reference to FIG. 2 above. The configuration message also comprises a pointer (e.g. FQDN) to the application server that these credentials are to be used with. For instance, LWM2M (Lightweight Machine to Machine), SNMP (Simple Network Management Protocol), OMA-DM (Open Mobile Alliance Device Management), TR-069 (Technical Report 069) can be used for this purpose. In this way, when the client device gets the server response from the application server, the client device can query its configurations for potential credentials to be used for responding to the authentication request.

Alternatively, this comprises modifying a key exchange message from the application server to the client device by including the modified context identifier and the client specific shared key in the key exchange message prior to forwarding the key exchange message to the client device, as described with reference to FIG. 3 above. This can be applied for TLS negotiation.

Using the presented method, the gateway is delegated by the client device to perform a large part of the computationally heavy operations of establishing secure communication with the application server. Also, for the cases where the session credentials are provided to the client device using a device management protocol such as for the HTTP digest case, the client device does not need to be modified to utilise the secure channel. On the server side, the application server or the authentication server can be left unmodified.

FIGS. 6A-B are flow charts illustrating methods for facilitating secure communication between a client device and an application server. The methods are performed in a network node which can be the authentication server 5 or the application server 3 of FIGS. 1A-B. The method corresponds to the actions performed by the application server 3 or the authentication server 5 in FIGS. 2-4.

In a receive message step 40, a message is received, which comprises a first FQDN for the application server and a modified context identifier. In the modified authentication server embodiment, the message is received from the application server. In the modified application server embodiment, the message is received from the client device.

In an extract original context identifier step 41, an original context identifier is extracted from the modified context identifier.

In an extract client identifier step 42, a client identifier is extracted from the modified context identifier. The client identifier is an identifier of the client device.

In an obtain $2^{nd}$ shared key step 44, a second client specific shared key is obtained based on the first FQDN, the original context identifier and the client identifier.

In a provide $2^{nd}$ shared key step 46, the second client specific shared key is provided for authentication of client device, e.g. by validating a digest response or by establishing a PSK TLS session as described above.

In the modified authentication server 5 embodiment, the method is performed in the authentication server, i.e. the network node is the authentication server. In such a case, the obtain $2^{nd}$ shared key step 44 comprises generating the second client specific shared key based on the first FQDN, the original context identifier, and the client identifier. The original context identifier is used to locate a shared key (Ks) which is not specific to the client device. This is explained in more detail above with reference to FIG. 4.

In the modified application server 3 embodiment, the method is performed in the application server, i.e. the network node is the application server 3. In such a case, the obtain $2^{nd}$ shared key step 44 comprises querying the authentication server 5 for the second client specific shared key by providing the first FQDN, the original context identifier and the client identifier. Optionally, the client identifier is sent as a separate parameter.

Looking now to FIG. 6B, only new or modified steps compared to the method illustrated by the flow chart of FIG. 6A will be described.

In a generate $2^{nd}$ FQDN step 43, a second FQDN is generated based on the first FQDN and the client identifier, e.g. using string concatenation as explained above.

In such a case, the obtain $2^{nd}$ shared key step 44 comprises obtaining the second client specific shared key based on the second FQDN and the original context identifier. The network node is then the application server and in this case the authentication server 5 does not need to be aware of the client specific aspects presented herein and can generate the second client specific shared key using a traditional key generation algorithm.

Figure 7:
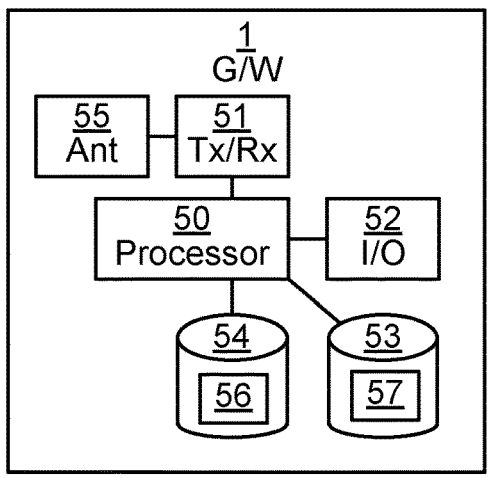
FIG. 7 is a schematic diagram showing some components of the gateway 1 of FIGS. 1A-B.

FIG. 7 is a schematic diagram showing some components of the gateway 1 of FIGS. 1A-B. A processor 50 is provided using any combination of one or more of a suitable central processing unit (CPU), multiprocessor, microcontroller, digital signal processor (DSP), application specific integrated circuit etc., capable of executing software instructions 56 stored in a memory 54, which can thus be a computer program product. The processor 50 can be configured to execute the method described with reference to FIG. 5 above.

The memory 54 can be any combination of read and write memory (RAM) and read only memory (ROM). The memory 54 also comprises persistent storage, which, for example, can be any single one or combination of magnetic memory, optical memory, solid state memory or even remotely mounted memory.

A data memory 53 is also provided for reading and/or storing data during execution of software instructions in the processor 50. The data memory 53 can be any combination of read and write memory (RAM) and read only memory (ROM). The memory 53 also comprises credentials 57, such as 3GPP credentials, e.g. stored in a USIM. The USIM can be provided using a physical card or by an electronically transferable subscriber identity module such as an MCIM.

The gateway 1 further comprises an I/O interface 52 for communicating with other external entities, e.g. using a wired network connection such as Ethernet. Optionally, the I/O interface 52 also includes a user interface.

The gateway 1 also comprises one or more transceivers 51, comprising analogue and digital components, and a suitable number of antennas 55 for wireless communication with client devices and with radio base stations of a mobile communication network (to thereby gain access to one or more application servers and one or more authentication servers). Optionally, the one or more application servers and one or more authentication servers are instead reachable via a wired IP based network, such as over an Ethernet connection or a wireless IP based network, such as Wi-Fi (any IEEE 802.11x standard).

Other components of the gateway 1 are omitted in order not to obscure the concepts presented herein.

Figure 8:
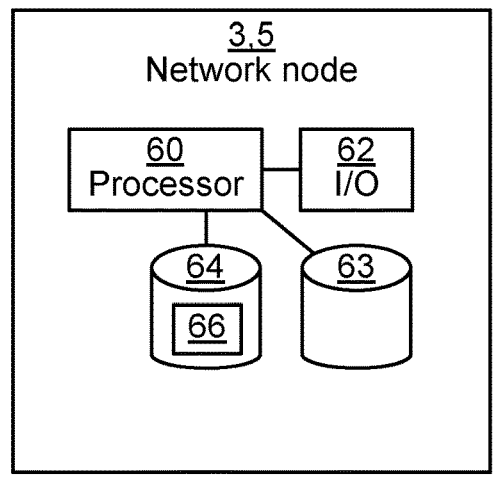
FIG. 8 is a schematic diagram showing some components of an application server of FIGS. 1A-B.

FIG. 8 is a schematic diagram showing some components of the network node 3, 5 of FIGS. 1A-B, e.g. an application server 3 or an authentication server 5. A processor 60 is provided using any combination of one or more of a suitable central processing unit (CPU), multiprocessor, microcontroller, digital signal processor (DSP), application specific integrated circuit etc., capable of executing software instructions 66 stored in a memory 64, which can thus be a computer program product.

The memory 64 can be any combination of read and write memory (RAM) and read only memory (ROM). The memory 64 also comprises persistent storage, which, for example, can be any single one or combination of magnetic memory, optical memory, solid state memory or even remotely mounted memory.

A data memory 63 is also provided for reading and/or storing data during execution of software instructions in the processor 60, e.g. to perform the any of the embodiments of methods described above with reference to FIGS. 6A-B. The data memory 63 can be any combination of read and write memory (RAM) and read only memory (ROM), e.g. in the form of a persistent storage, which, for example, can be any single one or combination of magnetic memory, optical memory, solid state memory or even remotely mounted memory.

The network node further comprises an I/O interface 62 for communicating with other external entities such as the gateway and the authentication server 5/application server 3, e.g. using a wired network connection such as Ethernet or a wireless connection e.g. using ZigBee, Wi-Fi (IEEE 802.11), Bluetooth, etc. The I/O interface 62 can optionally comprise a user interface.

Other components of the network node are omitted in order not to obscure the concepts presented herein.

Figure 9:
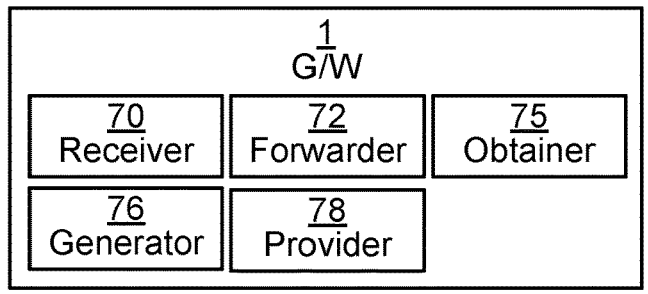
FIG. 9 is a schematic diagram showing functional modules of the gateway of FIGS. 1 and 7.

FIG. 9 is a schematic diagram showing functional modules of the gateway 1 of FIGS. 1 and 7. The modules can be implemented using software instructions such as a computer program executing in the gateway 1 and/or using hardware, such as application specific integrated circuits, field programmable gate arrays, discrete logical components, transceivers, etc. The modules correspond to the steps in the method illustrated in FIG. 5.

A receiver 70 corresponds to steps 30 and 34. A forwarder 72 corresponds to step 32. An obtainer 75 corresponds to step 35. A generator 76 corresponds to steps 36 and 37. A provider 78 corresponds to step 38.

Figure 10:
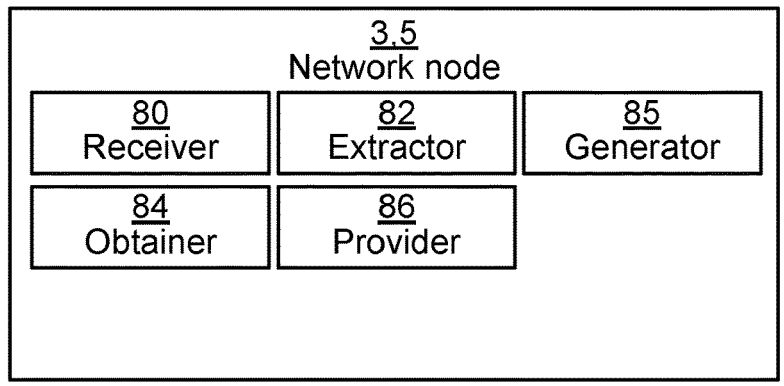
FIG. 10 is a schematic diagram showing functional modules of a network node of FIGS. 1A-B.

FIG. 10 is a schematic diagram showing functional modules of the network node 3, 5 of FIGS. 1A-B, e.g. an application server or an authentication server of FIGS. 1A-B. The modules can be implemented using software instructions such as a computer program executing in the network node and/or using hardware, such as application specific integrated circuits, field programmable gate arrays, discrete logical components, transceivers, etc. The modules correspond to the steps in the methods illustrated in FIGS. 6A-B.

A receiver 80 corresponds to step 40. An extractor 82 corresponds to steps 41 and 42. A generator 85 corresponds to step 43. An obtainer 84 corresponds step 44. A provider corresponds to step 46.

Figure 11:
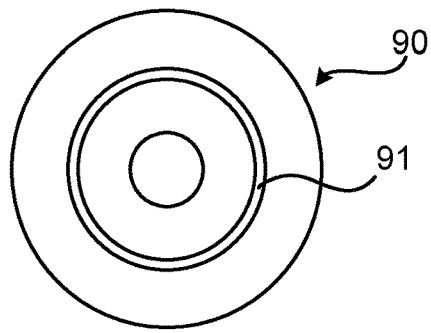
FIG. 11 shows one example of a computer program product 90 comprising computer readable means.

FIG. 11 shows one example of a computer program product 90 comprising computer readable means. On this computer readable means a computer program 91 can be stored, which computer program can cause a processor to execute a method according to embodiments described herein. In this example, the computer program product is an optical disc, such as a CD (compact disc) or a DVD (digital versatile disc) or a Blu-Ray disc. As explained above, the computer program product could also be embodied in a memory of a device, such as the computer program product 56 of FIG. 7 or the computer program product 66 of FIG. 8.

While the computer program 91 is here schematically shown as a track on the depicted optical disk, the computer program can be stored in any way which is suitable for the computer program product.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method for facilitating secure communication between a client device and an application server, the method comprising the steps of:
    a gateway receiving a client request transmitted by the client device, the client request comprising a first fully qualified domain name (FQDN) for the application server;
    the gateway forwarding the client request to the application server;
    the gateway receiving an application server response transmitted by the application server in response to the client request;
    the gateway determining whether the application server response indicates a need to provide authentication;
    the gateway obtaining a transaction identifier from an authentication server, wherein the transaction identifier is associated with a shared key, which is not specific to the client device;
    the gateway generating a context identifier that contains the transaction identifier obtained from the authentication server and a client identifier, the client identifier being an identifier of the client device;
    the gateway generating a client specific shared key based on the first FQDN, the client identifier and the shared key which is not specific to the client device; and
    as a result of determining that the application server response indicates a need to provide authentication, the gateway providing the context identifier, which contains the transaction identifier and the client identifier, and the client specific shared key to the client device to use for authentication with the application server.

2. The method of claim 1, wherein the step of generating the client specific shared key comprises generating a second FQDN based on the first FQDN and the client identifier and generating the client specific shared key based on the second FQDN.

3. The method of claim 1, wherein the step of providing the context identifier and the client specific shared key comprises sending a configuration message for configuring the credentials over a device management protocol, the configuration message comprising the context identifier and the client specific shared key, to the client device.

4. The method of claim 1, wherein the step of providing the context identifier and the client specific shared key comprises modifying a key exchange message from the application server to the client device by including the context identifier and the client specific shared key in the key exchange message prior to forwarding the key exchange message to the client device.

5. The method of claim 1, wherein the step of obtaining the transaction identifier comprises the use of a generic bootstrapping architecture, GBA.

6. A gateway for facilitating secure communication between a client device and an application server, the gateway comprising:
    a processor; and
    a memory storing instructions that, when executed by the processor, cause the gateway to: receive a client request transmitted by the client device, the client request comprising a first fully qualified domain name (FQDN) for the application server;
    forward the client request to the application server;
    receive an application server response transmitted by the application server in response to the client request;
    determine that the application server response indicates a need to provide authentication;
    obtain a transaction identifier from an authentication server, wherein the transaction identifier is associated with a shared key, which is not specific to the client device;
    generate a context identifier that contains the transaction identifier and a client identifier, the client identifier being an identifier of the client device;
    generate a client specific shared key based on the first FQDN, the client identifier and the shared key; and
    as a result of determining that the application server response indicates a need to provide authentication, provide the context identifier, which contains the transaction identifier and the client identifier, and the client specific shared key to the client device to use for authentication with the application server.

7. The gateway according to claim 6, wherein the instructions to generate the client specific shared key comprise instructions that, when executed by the processor, cause the gateway to generate a second FQDN based on the first FQDN and the client identifier and generating the client specific shared key based on the second FQDN.

8. The gateway according to claim 6, wherein the instructions to provide the context identifier and the client specific shared key comprise instructions that, when executed by the processor, cause the gateway to send a configuration message for configuring the credentials over a device management protocol, the configuration message comprising the context identifier and the client specific shared key, to the client device.

9. The gateway according to claim 6, wherein the instructions to provide the context identifier and the client specific shared key comprise instructions that, when executed by the processor, cause the gateway to modify a key exchange message from the application server to the client device by including the context identifier and the client specific shared key in the key exchange message prior to forwarding the key exchange message to the client device.

10. The gateway according to claim 6, wherein the instructions to obtain the transaction identifier comprise instructions that, when executed by the processor, cause the gateway to use a generic bootstrapping architecture, GBA.

11. A computer program product comprising a non-transitory computer readable medium storing a computer program for facilitating secure communication between a client device and an application server, the computer program comprising computer program code which, when run on a gateway cause the gateway to perform a method comprising:
    receiving a client request transmitted by the client device, the client request comprising a first fully qualified domain name (FQDN) for the application server;
    forwarding the client request to the application server;
    receiving an application server response transmitted by the application server in response to the client request;
    determining whether the application server response indicates a need to provide authentication;

obtaining a transaction identifier from an authentication server, wherein the transaction identifier is associated with a shared key, which is not specific to the client device;

generating a context identifier that contains the transaction identifier obtained from the authentication server and a client identifier, the client identifier being an identifier of the client device;

generating a client specific shared key based on the first FQDN, the client identifier and the shared key which is not specific to the client device; and as a result of determining that the application server response indicates a need to provide authentication, providing the context identifier, which contains the transaction identifier and the client identifier, and the client specific shared key to the client device to use for authentication with the application server.

12. A method for facilitating secure communication between a client device and an application server, the method being performed in a network node and comprising the steps of:

receiving a message comprising a first fully qualified domain name (FQDN) for the application server and a context identifier, wherein the context identifier contains a client identifier and a transaction identifier, and further wherein the client identifier contained in the context identifier is an identifier identifying the client device and the transaction identifier contained in the context identifier is associated with a first shared key;

extracting the transaction identifier from the context identifier;

extracting the client identifier from the context identifier;

obtaining a client specific shared key that was generated using the first FQDN, the first shared key, and the client identifier; and providing or using the client specific shared key for authentication of the client device.

13. The method of claim 12, further comprising:

generating a second FQDN that contains the first FQDN and the client identifier, wherein the step of obtaining the client specific shared key comprises:

the network node transmitting to an authentication server a key request message comprising i) the second FQDN that contains the first FQDN and the client identifier and ii) the transaction identifier; and receiving a response message transmitted by the authentication server as a response to the key request message, wherein the response message comprises the client specific shared key.

14. The method of claim 12, wherein the network node is an authentication server, and wherein the step of obtaining the client specific shared key comprises: using the transaction identifier to retrieve the shared key associated with the transaction identifier and generating the client specific shared key using the first FQDN, the client identifier, and the retrieved shared key.

15. The method of claim 12, wherein the network node is the application server and wherein the step of obtaining the client specific shared key comprises querying an authentication server for the client specific shared key by providing the first FQDN, the transaction identifier and the client identifier.

16. The method of claim 15, wherein the step of obtaining the client specific shared key comprises sending the client identifier as a separate parameter.

17. A network node for facilitating secure communication between a client device and an application server, the network node comprising:

a processor; and a memory storing instructions that, when executed by the processor, cause the network node to:

receive a message comprising a first fully qualified domain name (FQDN) for the application server and a context identifier, wherein the context identifier contains a client identifier and a transaction identifier, and further wherein the client identifier contained in the context identifier is an identifier identifying the client device and the transaction identifier contained in the context identifier is associated with a first shared key;

extract the transaction identifier from the context identifier;

extract the client identifier from the context identifier;

obtain a client specific shared key that was generated using the first FQDN, the first shared key, and the client identifier; and provide or use the client specific shared key for authentication of the client device.

18. The network node according to claim 17, further comprising instructions that, when executed by the processor, cause the network node to:

generate a second FQDN that contains the first FQDN and the client identifier; and wherein the instructions to obtain the client specific shared key comprise instructions that, when executed by the processor, cause the network node to transmit to an authentication sever a key request message comprising i) the second FQDN that contains the first FQDN and the client identifier and ii) the transaction identifier.

19. The network node according to claim 17, wherein the network node is an authentication server, and wherein the instructions to obtain the client specific shared key comprise instructions that, when executed by the processor, cause the network node to: use the transaction identifier to retrieve the shared key associated with the transaction identifier and generate the client specific shared key using the first FQDN, the client identifier, and the retrieved shared key.

20. The network node according to claim 17, wherein the network node is the application server and wherein the instructions to obtain the client specific shared key comprise instructions that, when executed by the processor, cause the network node to query an authentication server for the client specific shared key by providing the first FQDN, the transaction identifier and the client identifier.

21. The network node according to claim 20, wherein the instructions to obtain the client specific shared key comprise instructions that, when executed by the processor, cause the network node to send the client identifier as a separate parameter.

22. A computer program product comprising a non-transitory computer readable medium storing a computer program for facilitating secure communication between a client device and an application server, the computer program comprising computer program code which, when run on a network node, cause the network node to perform a method comprising:

receiving a message comprising a first fully qualified domain name (FQDN) for the application server and a context identifier, wherein the context identifier contains a client identifier and a transaction identifier, and further wherein the client identifier contained in the context identifier is an identifier identifying the client device and the transaction identifier contained in the context identifier is associated with a first shared key;

extracting the transaction identifier from the context identifier;

extracting the client identifier from the context identifier;

obtaining a client specific shared key that was generated using the first FQDN, the first shared key, and the client identifier; and providing or using the client specific shared key for authentication of the client device.

* * * * *